Dec. 30, 1958 R. W. TRIPP 2,866,946
MACHINE TOOL CONTROL
Filed Sept. 26, 1955 2 Sheets-Sheet 1

INVENTOR
Robert W. Tripp
BY
ATTORNEYS

Dec. 30, 1958 R. W. TRIPP 2,866,946
MACHINE TOOL CONTROL
Filed Sept. 26, 1955 2 Sheets-Sheet 2

INVENTOR
Robert W. Tripp
BY
ATTORNEYS

United States Patent Office 2,866,946
Patented Dec. 30, 1958

2,866,946

MACHINE TOOL CONTROL

Robert W. Tripp, Bronxville, N. Y., assignor, by mesne assignments, to Inductosyn Corporation, Carson City, Nev., a corporation of Nevada Application September 26, 1955, Serial No. 536,466

8 Claims. (Cl. 323—53)

This invention relates to linear position measurement transformers and more particularly to the application thereof to control of the motion of machine tool elements. The invention provides machine tool control by means of position measurement transformers, which control compensates for curvature in the guide members by which the machine elements, e. g. a bed and carriage, are moved with respect to each other in nominally straight paths.

Position measurement transformers useful in the relative positioning of machine elements are described in an application of Robert W. Tripp, Serial No. 509,168, filed May 18, 1955, and assigned to the assignee hereof, now Patent No. 2,799,835. Such transformers may comprise two members movable with respect to each other, one fastened to each of the machine elements whose relative positions or motions are to be controlled. One member bears a continuous winding in the form of a multiplicity of conductors disposed at uniform spacing from each other in an array extending parallel to the direction of intended relative motion of the members, the conductors extending transversely of that direction. The conductors are connected into a single series circuit so that adjacent conductors carry current in opposite directions transversely of the length of the array. The second member bears two windings similar to the winding of the first member but usually shorter and disposed with respect to each other in space quadrature of the cycle defined on the continuous winding of the first member by the separation, center to center, of three adjacent conductors of that winding, the separation being taken in the direction of relative motion of the two members. The members are supported for relative motion with their windings at a small and constant separation, and the design of the windings is preferably such that the voltage induced in any of them by a current in a winding of the other member is a substantially sinusoidal function of the relative position of the members, cyclical in a change of relative position of the members equal to this pole cycle.

In a typical installation for machine tool control the first member may be affixed to the bed of the machine and the second may be affixed to a carriage riding on ways on the bed, it being desired to move the carriage to a known position or succession of positions lengthwise of the bed, the two members being supported with their windings occupying closely spaced parallel planes.

A coarse positioning mechanism may be employed to drive the carriage to a position differing from that desired for it by less than one half of the pole cycle above defined. If the windings of the second member are then energized with in-phase A. C. voltages of amplitudes related as the sine and cosine of the space phase in the pole cycle defined by the desired position, the amplitude of the resultant voltage induced in the winding of the first member will be a measure of the departure of the carriage from the desired position therefor. The induced voltage may be used as an indication of corrections to be applied manually to the carriage, or it may be used as an input signal to a servo system arranged to drive the carriage to a position set up by apparatus which generates both coarse and fine command signals, the latter in the form of signals for excitation of the quadrature windings of the transformer.

The position along the bed to which the carriage is thus moved is a position defined for points fixed with reference to the carriage which are on the center line of the continuous winding. In practice however the point on the carriage or other machine element bearing the quadrature windings whose location with respect to the other machine element bearing the continuous winding is of interest will not be located on this center line. Instead it will be for example the axis of a rotating cutting tool journaled in the carriage at a position laterally displaced a substantial distance from both of the transformer members. If the ways which control the motion of the carriage are perfectly straight, no error is introduced by this displacement. In practice however the ways will not be perfectly straight, and the curvature of the ways will result in rotations of the machine elements with respect to each other. These rotations introduce errors into the locations of the point on one element to be located with respect to the other element. The present invention provides a method and means whereby these errors may be compensated for.

The precision measurement transformers disclosed in said application Serial No. 509,168 make possible the measurement of distances to accuracies of the order of .0001 inch, and correction according to the present invention is desirable to be provided if accuracy of this order of magnitude is to be preserved in the location with respect to each other of the significant parts of the machines in which the transformers are used. According to the present invention two or more position measurement transformers are provided with their continuous winding members fastened to one machine element in nominally parallel relationship. The similarly phased windings of the quadrature winding members of the two transformers are then connected in series and fed from a common source, and means are provided to combine the output signals from the continuous windings of the two transformers. By combining these output signals in appropriate proportions related to the position of the point whose location is to be controlled, compensation may be effected for rotations of the carriage. The invention will now be described in further detail with reference to the accompanying drawings in which:

Figure 5:
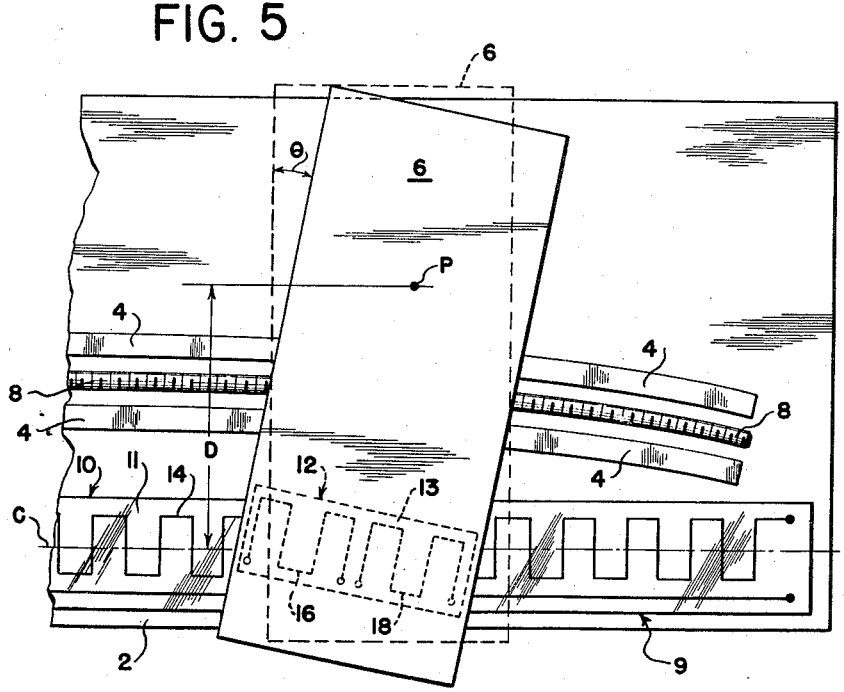
Fig. 5 is a diagram illustrating the positional error corrected by means of the invention.

The error compensated for by the invention is illustrated in the diagram of Fig. 5. In this figure the bed of a machine tool is indicated fragmentarily at 2, supporting by means of ways 4 a carriage 6 for motion lengthwise of the ways. For such motion the carriage is engaged at a nut not shown by a lead screw 8 journaled on the bed. The ways are nominally straight, but possess in the plane of the figure an error curvature, much exaggerated in the figure for clarity.

The position of the carriage is measured and indicated by means of a position measurement transformer generally indicated at 9, one member of which generally indicated at 10 is fastened to the bed and the other member of which generally indicated at 12 is fastened to the carriage, on the underside thereof as seen in Fig. 5. The member 10 includes an insulating support 11 on which is laid down a continuous winding 14 in the plane of the figure, and the member 12 includes an insulating support 13 and two similar windings 16 and 18 in space quadrature of the pole cycle of winding 14. Winding 14 extends lengthwise of the bed over the intended range of carriage positions. For this purpose it may be made up of a number of portions on separate supports, suitably connected together.

For a given relative position of transformer members 10 and 12 lengthwise of each other the carriage is, with the curvature of the ways indicated, rotated through an angle $\theta$, and a point P fixed on the carriage at a distance D from the center line C of winding 14 is displaced lengthwise of the bed, i. e. parallel to the length of transformer member 10 which may be assumed to be straight, through a distance $e = D \sin \theta$. Point P is also displaced transversely of member 10 by a small distance $D(1 - \cos \theta)$, but since $\theta$ will be small in any practical application this displacement may be disregarded. The error $D \sin \theta$ however may be substantial by comparison with the accuracies which can be achieved in the positioning of the transformer members with respect to each other with position measurement transformers as disclosed in application Serial No. 509,168. The present invention provides for the correction of this error.

Figure 1:
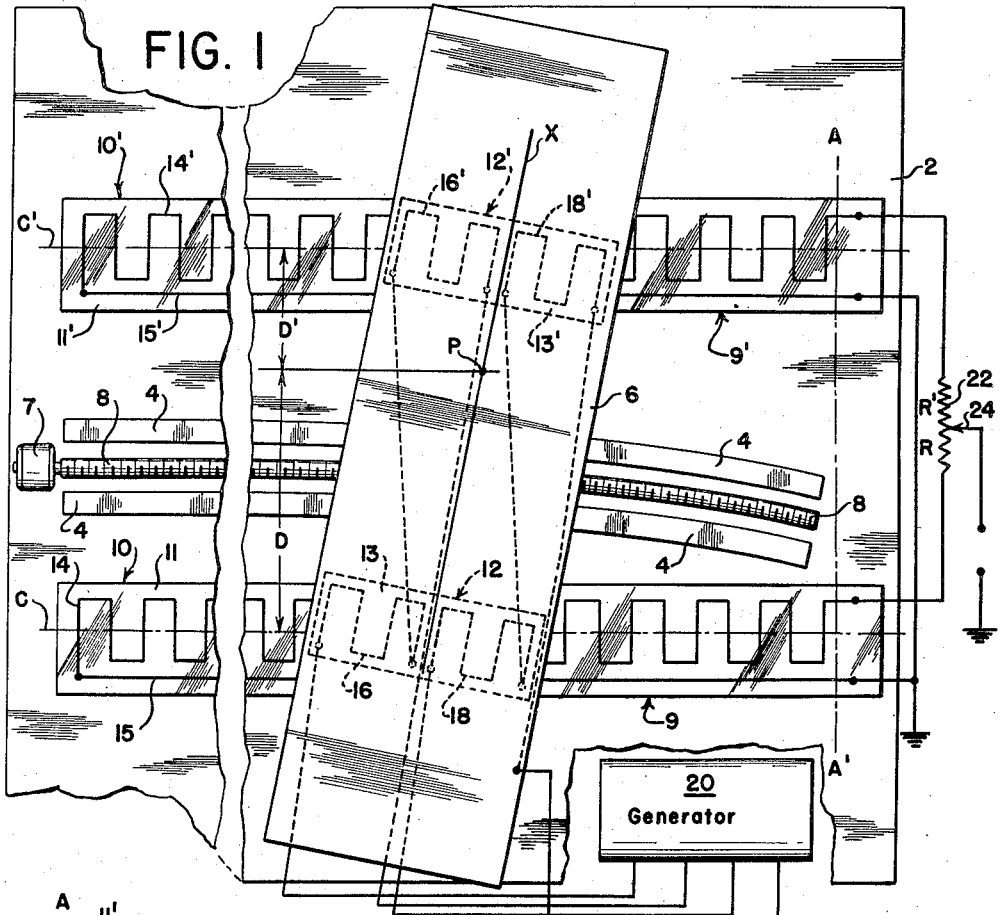
Fig. 1 is a diagrammatic representation of one embodiment of the invention.

An embodiment of the invention suitable for compensating the positional error described with reference to Fig. 5 is illustrated in Fig. 1. In Fig. 1 the machine bed 2, ways 4, carriage 6 and transformer 9 comprising members 10 and 12 are arranged generally as in the diagrammatic showing of Fig. 5. A motor 7 is shown coupled to the lead screw. According to the invention there is provided a second position measuring transformer 9' comprising members 10' and 12', the member 10' being fixed to the bed parallel to the member 10 and positioned so that its cooperating member 12' may be attached to the carriage remotely from the portion of the carriage to which the member 12 is affixed. The two transformers are preferably identical and must have the same pole cycle. Members 12 and 12' are so supported on the carriage that, with the carriage on a straight portion of the ways, windings 16 and 16' will be in the same positional phase relation to windings 14 and 14' respectively, and likewise windings 18 and 18' will be in the same positional phase with respect to windings 14 and 14'. Conductors 15 and 15' are provided for connection of external leads to the ends of windings 14 and 14' at one end of members 10 and 10'.

On the carriage, windings 16 and 16' of one space phase are connected in series, and windings 18 and 18' are similarly connected in series by means of leads as shown, so that on a straight portion of the ways with the cophasal physical relation just recited for the quadrature winding of each transformer with respect to its continuous winding, the amplitudes of the voltages induced by windings 16 and 16' in windings 14 and 14' will be in the same phase of the cyclical variation which they undergo with carriage motion along the ways. A similar relation holds true for windings 18 and 18' with respect to windings 14 and 14'. The two pairs of series-connected windings 16, 16' and 18, 18' are energized from a generator 20 adapted to generate two in-phase A. C. voltages of amplitudes related as the sine and cosine of a desired space phase in one cycle of one of the continuous windings 14 and 14'. Either of the continuous winding members 10 and 10' may be taken as the dimensional reference.

In the embodiment of Fig. 1 the continuous windings 14 and 14' are also connected in series, and the series connection thereof is applied to the ends of a potentiometer 22. The interconnection of windings 14 and 14' is so effected that one pair of electrically similar ends of those windings is connected together while the other pair is connected to the ends of the potentiometer. This means that on a straight portion of the ways, if the carriage is at a position such that the resultant voltage induced in winding 14 by windings 16 and 18 is not zero, the resultant voltage induced by windings 16' and 18' into winding 14' will be in series opposition to that induced in winding 14 around the loop including windings 14 and 14' and potentiometer 22.

Conveniently, as shown in Fig. 1 the junction of windings 14 and 14' remote from the potentiometer is grounded, and the net error voltage from the combination of both transformers is observed between tap 24 of potentiometer 22 and ground, the contributions of the two transformers to this net being weighted according to the position of tap 24.

If the point P is halfway between center lines C and C', and if the coupling functions for the transformers are identical, the error signal due to rotation of the carriage (as distinguished from that due to incorrect position along the ways) which is induced in winding 14' will be equal in magnitude and opposite in polarity or time phase to that induced in winding 14 when the point P is correctly positioned along the ways. Hence under these conditions the windings may according to the invention be connected for series aiding of the voltages induced in them on a straight portion of the ways, and this sum may be taken as a net error voltage for the entire system, going to zero when the carriage properly positions point P whether the carriage has suffered rotation or not. In practice however it is desirable that provision be made for driving the carriage by reference to points P thereon not halfway between C and C'. Such provision is made with the potentiometer 22 of Fig. 1 and the series opposing connections shown, wherein the two windings 14 and 14' act essentially as parallel connected generators to the error channel between tap 24 and ground. Tap 24 is positioned to divide potentiometer 22 into two portions of resistance values R from the end of the potentiometer adjacent winding 14 to the tap and R' from the tap to the end of the potentiometer adjacent winding 14' related as the distance D from C to P is to the distance D' from P to C'.

Figure 2:
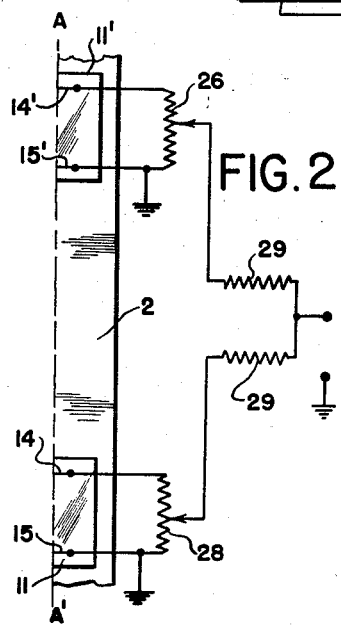
Figs. 2 and 3 are fragmentary diagrammatic representations of a second and third embodiment of the invention respectively differing from that of Fig. 1 in respect of the structure to the right of the dash line A—A in Fig. 1.

Of course other arrangements may be employed to combine properly proportioned fractions of the separate error voltages from windings 14 and 14'. One such alternative arrangement is shown in Fig. 2. The embodiment of Fig. 2 includes all of the structure to the left of the dash line AA' in Fig. 1 as well as the structure actually shown in Fig. 2. Here separate and equal potentiometers 26 and 28 are connected across windings 14 and 14' respectively, and the voltages taken therefrom are combined in summing resistors 29. The sum voltage may either be observed on a meter connected between the junction of resistors 29 and ground (with the grounding of common side of windings 14 and 14' shown) or it may be put into the error channel of a servo system whose output feeds the motor 7.

With the circuit of Fig. 2 the taps on potentiometers 26 and 28 should be adjusted in accordance with the ratio $D/D'$ so that the fractions of the total voltages across potentiometers 26 and 28 which are taken therefrom at these taps are related to each other as D is to D'. That the relation is an inverse one may be seen upon considering the fact that if D is much larger than D', the influence of winding 14 should be small, going to zero when D' goes to zero. Conveniently, the potentiometers may be calibrated in terms of D and D' so that when D' is equal to zero the entire output of winding 14' is taken while none is taken from potentiometer 28, and vice versa. The two potentiometers may be ganged together to move in opposite directions and coupled to a control calibrated in terms of D only.

Figure 3:
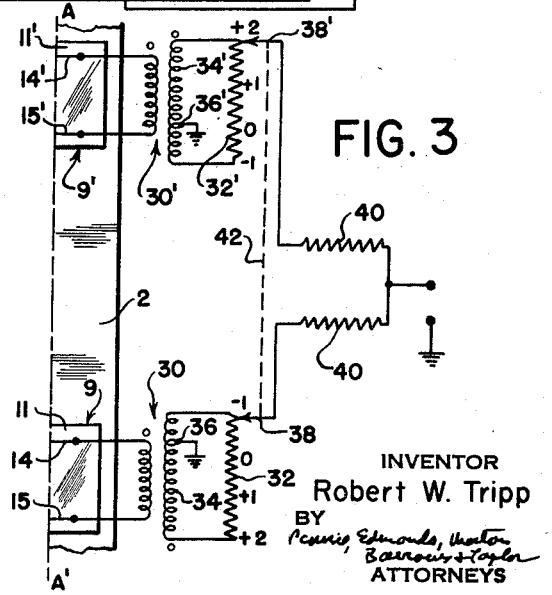

The invention is also applicable to the correction of errors in the positioning with respect to the bed of points on the carriage lying outside the region between the two position measurement transformers. An embodiment of the invention adapted to compensate for such errors is illustrated in Fig. 3. As with Fig. 2, the embodiment of Fig. 3 includes all of the structure to the left of the dashed line AA' in Fig. 1 in addition to the structure shown in Fig. 3 itself. In this embodiment windings 14 and 14' are connected respectively to the primary winding of two transformers 30 and 30'. Transformers 30 and 30' may be of conventional type with ferromagnetic cores and high coupling factors and with their primary and secondary windings in fixed relative position. If the embodiment of Fig. 3 is to be able to compensate for errors in the location of working points on the carriage as far outside C and C' as C is separated from C', it is convenient though not necessary to arrange transformers 30 and 30' as step-up transformers having a 3:1 ratio of secondary to primary turns. Potentiometers 32 and 32' are connected across the secondary windings 34 and 34' on transformers 30 and 30' and these secondaries are tapped by taps 36 and 36' at points which are ⅔ of the turns from ends of these secondaries similarly phased with respect to their primaries. For simplicity in the showing of the linkage between the taps 38 and 38' on potentiometers 32 and 32' one of the secondaries is turned over in Fig. 3, similarly phased ends of the windings in both transformers being indicated by small circles in the figure. For ease of illustration the two taps are indicated as connected to ground, although they may be connected together to provide one side of a balanced output channel from the system for connection to a servo, if such is provided.

Tapping of the transformer secondaries at the ⅔ points thereof provides on each potentiometer a range of voltages of amplitudes from +2 to −1 arbitrary units. This is the range of amplitudes in opposite polarities required at each potentiometer in order to permit correction of carriage position with respect to working points P having a maximum displacement beyond C or C' equal to the separation of C and C', as will presently be seen. The 3:1 step-up ratio mentioned is advantageous in connection with such a range of working point positions in order to preserve unchanged the gain level through the network of Fig. 3, but it is not essential to provision of compensation over this range of working point positions transversely of the position measurement transformers.

Taps 38 and 38' of potentiometers 32 and 32' lead to summing resistors 40, whose junction together with the common point of taps 36 and 36' forms the output circuit from transformers 9 and 9' in the embodiment of Fig. 3.

Taps 38 and 38' are preferably linked by a mechanical linkage 42 to move over the potentiometers so as to divide them into portions of the same ratio.

The operation of the embodiment of Fig. 3 will be explained with reference to Fig. 4 where parallel lines C and C' represent the center lines of the continuous windings 14 and 14'. Two further lines E and F are shown parallel to C and C' outboard of the pair C, C' on opposite sides thereof. E is distant from C' by the separation of C and C', and F is distant from C by the same amount. A straight line N, normal to E, C, C' and F, represents a locus of desired positions lengthwise of the machine bed, i. e. lengthwise of the position measurement transformer windings 14 and 14'. All points on line N have the same coordinate lengthwise of the bed. The locus N may have any space phase in the pole cycle of windings 14 and 14', and the embodiment of Fig. 3 provides for the positioning on N of a working point P on the carriage having any location transverse of the length of windings 14 and 14' between the limits E and F, in spite of curvature in the ways which guide the carriage.

Figure 4:
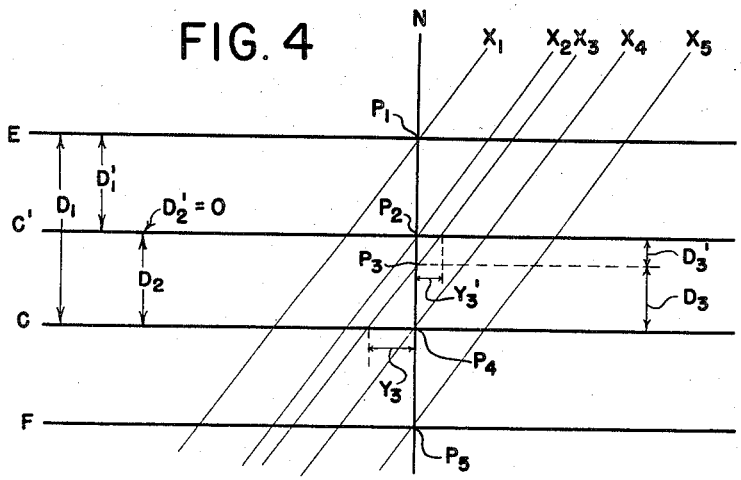
Fig. 4 is a diagram useful in explaining the embodiment of Fig. 3.

In Fig. 4 five parallel lines $X_1$–$X_5$ represent, for five closely adjacent positions of the carriage lengthwise of the ways, the positions with respect to the bed of a single rectilinear locus X (Fig. 1) fixed to the carriage. X is perpendicular to C and C' when the carriage is on a portion of its ways which are straight and parallel to windings 14 and 14'. With such straight ways windings 16 and 16' are in the same space phase with respect to X, and so are windings 18 and 18'. The inclination of $X_1$–$X_5$ to N, much exaggerated, represents the rotation of the carriage due to curvature of the ways. $X_1$–$X_5$ are parallel to each other since, over the short amount of carriage travel between $X_1$ and $X_5$, the increment in curvature of the ways may be neglected.

$X_1$, $X_2$, $X_4$ and $X_5$ respectively intersect N at points $P_1$, $P_2$, $P_4$ and $P_5$ which are located on E, C', C and F respectively. The position of $X_1$ with respect to N therefore represents the position of the carriage required to locate on N a working point $P_1$ fixed in the carriage on X at a distance from C' equal to the separation of C and C'. From the foregoing statement, the significance of $X_2$, $X_4$ and $X_5$ will be obvious. $X_3$ represents the position of the carriage required to locate on N a working point $P_3$ fixed on X somewhere between C and C'.

Consider first the working point $P_3$. When the carriage positions its locus X at $X_3$, transformers 9 and 9' have, in the relation of their members, opposite positional errors $y_3$ and $y_3'$, proportional to the distance $D_3$ from C to $P_3$ and $D_3'$ from $P_3$ to C'. $y_3$ and $y_3'$ are of opposite sign since electrically they repersent opposite increments in phase from the phase in the pole cycle of windings 14 and 14' at N. In practice, the positional errors must not exceed a quarter of that pole cycle.

Figs. 1 and 2 illustrate two circuits by which upon carriage motion achievement of this proportionality between the two positional errors and the distances $D_3$ and $D_3'$ may be recognized. The opposite polarity of the positional errors, in terms of the voltages induced in windings 14 and 14', is taken into account in the embodiment of Fig. 1 by the series interconnection of windings 14 and 14'. This interconnection is opposing for the error voltages of the same time phase due to error in the carriage position lengthwise of the ways as such, i. e. the error which would be observed even with the carriage on ways straight and parallel to windings 14 and 14'. This interconnection is hence series aiding for the error voltages of opposite time phase due to carriage rotation, i. e. the error voltages associated with the positional errors $y_3$ and $y_3'$ of Fig. 4. These latter error voltages, which may be referred to as error voltages of the second order, are the ones with which the present invention is concerned. In Fig. 1 they are in series aiding around the loop including windings 14, 14' and 22, and correct positioning of the carriage for the working point $P_3$ (P in Fig. 1) is recognized in spite of the carriage rotation when zero volts are experienced between tap 24 and ground with that tap set so that R is to R' as D is to D'.

The opposite sign of $y_3$ and $y_3'$ is taken into account in the embodiment of Fig. 2 by the fact that voltages of opposite time phase are added at summing resistors 29 to produce zero output from the circuit of Fig. 2 when the carriage is correctly positioned.

With respect to a working point position such as $P_3$ between C and C' the embodiment of Fig. 3 is essentially the same as that of Fig. 2. Transformers 30 and 30' have simply been interposed between windings 14 and 14' and potentiometers corresponding to potentiometers 26 and 28 of Fig. 2. In Fig. 3 however the potentiometers corresponding to potentiometers 26 and 28 of Fig. 2 are so much of potentiometers 32 and 32' as lie between the points of ground potential thereon and the points of arbitrary voltage amplitude +1. Taps 38 and 38' divide these potentiometers into portions so as to take therefrom voltage fractions which are related as $D_3'$ is to $D_3$. For example if $P_3$ is halfway between C and C' both of taps 38 and 38' will connect with the potentiometers at points of arbitrary voltage amplitude levels +½, just as in the case of Fig. 2 (assuming unity arbitrary voltage amplitude levels across potentiometers 26 and 28). If P₃ is two-thirds of the distance from C to C' so that $D_3=2D_3'$, tap 38' will be at the level $+\frac{2}{3}$ while tap 38 will be at the level $+\frac{1}{3}$.

In the case of carriage position X₂ for which the positional error at transformer 9' is zero, for zero output signal from the system taps 38 and 38' are shifted so that tap 38 is at the voltage level 0 opposite the ground tap 36 while tap 38' is at the level +1. The net error voltage from the system between the junction of resistors 40 and ground is then zero when the signal induced in winding 14' is zero, as is desired. The signal induced in winding 14 is then substantial, but no part of it appears at the junction of resistors 40.

For working point positions outside the space between C and C' the positional error at the transformer adjacent the working point changes sign, just as the sign of the distance from that transformer to the working point changes sign. The positional errors thus assume the same sign. Thus in Fig. 4 for carriage position X₁ the positional error at winding 14' is the same as that which existed at winding 14 for carriage position X₂ whereas the error at 14 is twice what it was for the carriage position X₂. This requires tap 38 to shift to a voltage negative with respect to ground, of amplitude level −1, and requires tap 38 to shift to a position of voltage level +2, again in accordance with the ratio $D_1/D_1'=-2=+2/-1$.

While the invention has been described in terms of a number of preferred embodiments, numerous variations and departures may be made from the structures shown and described herein. For example, an embodiment suitable for correction of working point positions outside the space between the two position measurement transformers may be made directly from that of Fig. 2 without the addition of the transformers 30 and 38' of Fig. 3 by grounding in each of potentiometers 26 and 28 a point intermediate the ends of the potentiometer to divide each potentiometer into two parts related as the ratio of the maximum distances from such working point positions to the center lines of the two transformers. The distances here in question, like those discussed hereinabove, are of course distances in the plane of the transformers, i. e. in the plane defined by the center lines C and C', measured to the projection onto that plane of the working point position.

Still other means may be employed for providing in inverted polarity the voltage from one or both of the transformer windings 14 and 14', according as working point positions beyond one or the other or both of the transformers are to be corrected.

The invention is also applicable to compensation for curvature in three dimensions of the guide ways or other surfaces by which the machine elements such as a carriage and bed are constrained to move relatively to each other. For this purpose three parallel but non-coplanar position measurement transformers are employed. By suitably combining the error outputs, i. e. the outputs from the continuous windings, of the three transformers according to the location of the working point, a working point located anywhere in a plane transverse to the length of the three transformers can be moved to positions lengthwise of the transformers corrected for compound curvature of the guide ways.

I claim:

1. In a machine including two elements one of which is movable relative to the other along a path defined by nominally rectilinear guiding surfaces in one of said elements, means to adjust the position of a point in one of said elements along a rectilinear path with respect to the other of said elements in spite of curvature of said surfaces, said means comprising two linear position measurement transformers each including a continuous winding having a repeating pole cycle and two windings in space quadrature of said pole cycle, said continuous windings having the same pole cycle and being arranged on one of said elements substantially parallel to each other and to the path of motion of the other of said elements relative to said one element, said quadrature windings being arranged on the other of said elements, means to energize with the same currents said quadrature windings in pairs each including the windings from said two transformers having the same positional phase relative to their continuous windings, and means to combine the voltages induced in said continuous windings in proportions inversely related to the distances in the plane of said continuous windings between said continuous windings and the projection of said point onto said plane.

2. Apparatus in accordance with claim 1 in which said last named means includes a potentiometer connected into a loop circuit including said potentiometer and said continuous windings in series.

3. Apparatus according to claim 1 in which said last named means includes two potentiometers each connected across the terminals of one of said continuous windings.

4. Apparatus according to claim 1 in which said last named means includes means to develop one of said voltages in inverse polarity for adjustment of a point in said one element whose projection onto said plane lies outside the region between said continuous windings.

5. In combination, a machine including a bed and a carriage, said bed having nominally rectilinear guide ways supporting said carriage, said ways defining a path of motion for said carriage relative to said bed, and means to adjust the position of points fixed in said carriage along rectilinear paths defined with respect to said bed in spite of curvature of said ways, said means comprising two linear position measurement transformers each including a continuous winding having a repeating pole cycle and two windings in space quadrature of said pole cycle, the continuous windings of said transformers having the same pole cycle and being disposed on said bed substantially parallel to each other and to the path of motion of said carriage, the quadrature windings of said transformers being disposed on said carriage such that, with the carriage on a rectilinear portion of said ways parallel to said continuous windings, said quadrature windings have the same positional phases with respect to said continuous windings in pairs each including one quadrature winding from each of said transformers, means to energize with one current both windings of one of said pairs and to energize with another current both windings of the other of said pairs, said currents being related in amplitude as the sine and cosine of a selected phase in the pole cycle of said continuous windings; two potentiometers, one for each of said transformers, means to couple each of said continuous windings across one of said potentiometers, means coupling to a common point of fixed potential two points disposed one in each of said potentiometers intermediate the ends thereof, and means to combine the voltages at the taps on said potentiometers.

6. In combination, a machine including a bed and a carriage, said bed having nominally rectilinear guide ways supporting said carriage, said ways defining a path of motion for said carriage relative to said bed, and means to adjust the position of points fixed in said carriage along rectilinear paths defined with respect to said bed in spite of curvature of said ways, said means comprising two linear position measurement transformers each including a continuous winding having a repeating pole cycle and two windings in space quadrature of said pole cycle, the continuous windings of said transformers having the same pole cycle and being disposed on said bed substantially parallel to each other and to the path of motion of said carriage, the quadrature windings of said transformers being disposed on said carriage such that, with the carriage on a rectilinear portion of said ways parallel to said continuous windings, said quadrature windings have the same positional phases with respect to said continuous windings in pairs each including one quadrature winding from each of said transformers, means to energize with one current both windings of one of said pairs and to energize with another current both windings of the other of said pairs, said currents being related in amplitude as the sine and cosine of a selected phase in the pole cycle of said continuous windings, two potentiometers, one for each of said transformers, means to couple each of said continuous windings across one of said potentiometers, means coupling to a common point of fixed potential two points disposed one in each of said potentiometers intermediate the ends thereof, said last-named points each dividing one of said potentiometers into two portions the ratio of whose resistances is the same for both potentiometers, the numerator portions in said ratios being measured from ends of said potentiometers similarly phased via said coupling means with respect to said continuous windings.

7. In combination, a machine including a bed and a carriage, said bed having nominally rectilinear guide ways supporting said carriage, said ways defining a path of motion for said carriage relative to said bed, and means to adjust the position of points fixed in said carriage along rectilinear paths defined with respect to said bed in spite of curvature of said ways, said means comprising two linear position measurement transformers each including a continuous winding having a repeating pole cycle and two windings in space quadrature of said pole cycle, the continuous windings of said transformers having the same pole cycle and being disposed on said bed substantially parallel to each other and to the path of motion of said carriage, the quadrature windings of said transformers being disposed on said carriage such that, with the carriage on a rectilinear portion of said ways parallel to said continuous windings, said quadrature windings have the same positional phases with respect to said continuous windings in pairs each including one quadrature winding from each of said transformers, means to energize with one current both windings of one of said pairs and to energize with another current both windings of the other of said pairs, said currents being related in amplitude as the sine and cosine of a selected phase in the pole cycle of said continuous windings, two potentiometers, two transformers of the same turns ratio each arranged to couple the voltage induced in one of said continuous windings across one of said potentiometers, means coupling to a common point of fixed potential two points disposed one in each of said potentiometers intermediate the ends thereof, said last-named points each dividing one of said potentiometers into portions the ratio of whose resistances is the same for both potentiometers, the portions corresponding to the numerators of said ratios being measured from ends of said potentiometers similarly phased via said last-named transformers with said continuous windings, a tap on each of said potentiometers, and means linking said taps such that with one tap at one end of onee potentiometer the other tap is at the oppositely phased end of the other potentiometer.

8. In combination, a machine including a bed and a carriage, said bed having nominally rectilinear guide ways supporting said carriage and defining a path of motion for said carriage, a linear position measurement transformer for positioning said carriage lengthwise of said ways, said transformer having a continuous winding of uniform pole cycle arranged on said bed to extend substantially parallel to said ways and two windings in space quadrature of said pole cycle arranged on said carriage, and means to adjust lengthwise of said ways the position of a fixed point in said carriage substantially laterally displaced from said continuous winding, said means comprising a second position measurement transformer having the same pole cycle as the first and having its continuous winding arranged on said bed parallel to the continuous winding of said first transformer and having its quadrature windings arranged on said carriage in such position that with said carriage on a straight portion of said ways parallel to said continuous windings the quadrature windings of said transformers have the same positional phases with respect to said continuous windings in pairs each including a quadrature winding from each of said transformers, means to energize with one current both windings of one of said pairs and to energize with another current both windings of the other of said pairs, said currents being related in amplitude as the sine and cosine of a selected phase in the pole cycle of said continuous windings, and means to combine the voltages induced in said continuous windings in proportions inversely related to the distances in the plane defined by said continuous windings from said continuous windings respectively to the projection of said fixed point onto said plane.

References Cited in the file of this patent
UNITED STATES PATENTS 2,559,575    Frykland et al. _____ July 3, 1951
2,679,620    Berry _____ May 25, 1954